United States Patent [19]
Ehlers

[11] Patent Number: 4,893,431
[45] Date of Patent: Jan. 16, 1990

[54] FISHING LURE

[76] Inventor: Harry M. Ehlers, 5330 E. Kemper Rd., Cincinnati, Ohio 45241

[21] Appl. No.: 240,530

[22] Filed: Sep. 6, 1988

[51] Int. Cl.⁴ .............................................. A01K 85/00
[52] U.S. Cl. .................................. 43/42.47; 43/42.49; 43/42.35
[58] Field of Search .................... 43/43.2, 44.3, 42.08, 43/42.22, 42.35, 42.4, 42.42, 42.47, 42.49, 42.3

[56] References Cited

U.S. PATENT DOCUMENTS

| | | | |
|---|---|---|---|
| 1,365,813 | 1/1921 | Brown | 43/42.49 |
| 1,371,348 | 3/1921 | Brown | 43/42.49 |
| 1,615,803 | 1/1927 | Pflueger | 43/42.49 |
| 1,777,954 | 8/1927 | Weller . | |
| 1,840,273 | 1/1932 | Lang | 43/42.47 |
| 1,993,018 | 3/1935 | Pfeifle | 43/42.3 |
| 2,079,883 | 5/1937 | Valasek | 43/42.49 |
| 2,333,174 | 11/1943 | Heddon | 43/42.47 |
| 2,503,369 | 4/1950 | Wycech | 43/42.47 |
| 2,580,104 | 12/1951 | King | 43/42.47 |
| 2,598,360 | 5/1952 | Cummins | 43/42.35 |
| 2,611,205 | 4/1949 | Steel | 43/42.3 |
| 2,682,128 | 6/1954 | Weigandt | 43/42.22 |
| 2,726,472 | 12/1955 | Griffin | 43/42.04 |
| 3,521,394 | 7/1970 | Wintersberger | 43/42.06 |
| 4,044,491 | 8/1977 | Potter | 43/42.22 |
| 4,129,957 | 12/1978 | Thirlby | 43/42.49 |
| 4,819,365 | 4/1989 | Landuyt | 43/42.47 |

*Primary Examiner*—Kurt Rowan
*Attorney, Agent, or Firm*—Frost & Jacobs

[57] ABSTRACT

A fishing lure has a forwardly extending lip which is configured to impart action to the lure, to which a link is attached that has a loop configured to be connected to a fishing line. The link has a guard portion which extends at least partially below the leading edge of the lip, thereby preventing weeds and other foreign objects from becoming entangled about the link where it connects to the lip.

5 Claims, 1 Drawing Sheet

FISHING LURE

TECHNICAL FIELD

The present invention relates generally to fishing lures and is particularly directed to artificial fishing lures of the type having elements designed to impart oscillatory action to the lure. The invention will be specifically disclosed in connection with a soft bodied fishing lure having an action imparting lip with a guard link which prevents entanglement by weeds of the lip and link.

BACKGROUND OF THE INVENTION

Artificial fishing lures are well known in the art. They are typically constructed to duplicate as accurately as possible the natural action of a fish swimming freely in the water, or to entice fish to strike at the lure through other non-naturally occurring actions. One type of action which many lures exhibit as they are drawn through the water is oscillatory motion in a vertical plane.

One method which has been used by the prior art to impart such oscillatory action to the lure is to provide the lure with a forwardly extending lip. Such a lip is shown in U.S. Pat. No. 2,611,205. As the lure is pulled through the water by a fishing line, water flows over the top of the lip, causing the lure to dive deeper. As the lure dives deeper, the angle of the fishing line tends to pull the lure upwardly, these two opposing forces resulting in an oscillatory path being followed by the fishing lure as it is pulled through the water.

A major problem with this design is that weeds and other marine objects can easily become entangled about the lip at the point where the fishing line is attached directly to the lip. When foreign objects become entangled at this point, the action of the lure is impeded due to the drag created by the foreign object and its effect on the flow of water around the lip. When the action of the lure is impeded, the effectiveness of the lure in enticing fish to strike at it is thereby diminished.

SUMMARY OF THE INVENTION

Accordingly, it is a primary object of the present invention to provide a fishing lure having a lip with an attachment point which will not allow weeds or other foreign objects to become entangled about it.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved fishing lure is provided for preventing impedment of action of the lure imparted by a lip associated with the lure. The fishing lure has a body having a lip with a leading edge extending forwardly. The lip is configured to impart action to the lure. An attachment point is located on the lip. A link which has an attachment end, a loop and a guard portion is also provided. The attachment end is attached to the attachment point of the lip. The loop is spaced from the attachment point and configured to be connected to a fishing line. The guard portion extends at least partially below the leading edge of the lip and generally rearwardly.

According to further aspect of the present invention, at least one hook is connected to the lure which has a tip that projects generally forwardly in close proximity to the body of the lure.

In yet another aspect of the invention, the lip has a rearwardly extending reach which is disposed within the body. The hook is secured to the reach.

In a still further aspect of invention, the body is yieldable under the bite of fish.

In accordance to yet another aspect of the invention, tassles are provided extending rearwardly from the body.

According to a still further aspect of the present invention, a fishing lure is provided having a body which is yieldable under the bite of a fish. A lip extends forwardly from the body, the lip being configured to impart action to the lure. The lip has a leading edge and a rearwardly extending reach which is disposed within the body. There is at least one hook connected to the reach, which has a tip that projects generally forwardly in close proximity to the body. Tassles are provided which extend rearwardly from the body. There is an attachment point associated with the lip. A link is also provided which has an attachment end, a loop and a guard portion. The attachment end is attached to the attachment point of the lip. The loop is spaced from the attachment point and configured to be connected to a fishing line. The guard portion extends at least partially below the leading edge and generally rearwardly.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects, all without departing from the invention. Accordingly, the drawings and descriptions will be regarded as demonstrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings

DETAIL DESCRIPTION OF THE PREFERRED EMBODIMENT

Figure 1:
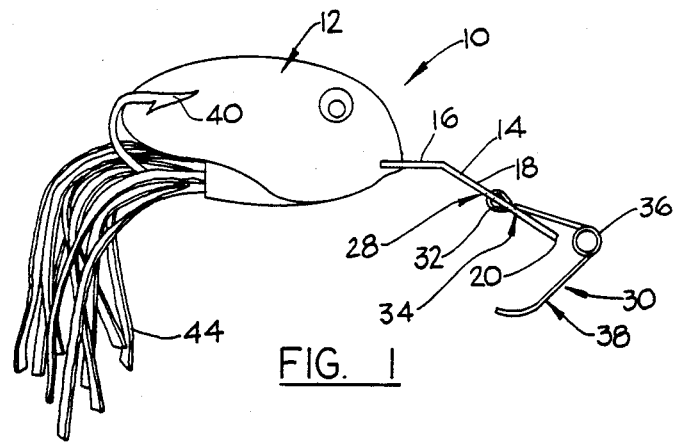
FIG. 1 is a side elevational view of a fishing lure in accordance with the present invention.

Referring now to the drawings, FIG. 1 shows a side elevational view of the fishing lure in accordance with the present invention. Lure 10 is comprised of a body 12 which is generally fish like in shape, having markings and colorings similar to that of fish. Such shapes, marking and coloring are generally well known in the art. Lip 14 is shown extending from the front of body 12. Lip 14 is comprised of a first planar section 16 and a second planar section 18. An angle is formed between section 16 and section 18 at the intersection thereof, such that section 18 extends downwardly relative to section 16. Lip 14 has a leading edge 20 formed adjacent section 18.

Figure 2:
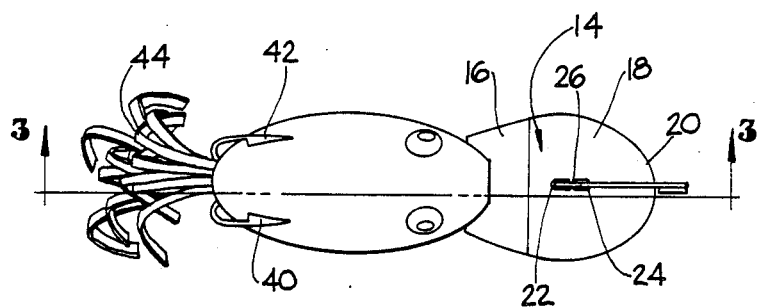
FIG. 2 is a top plan view of a fishing lure in accordance with the present invention.

Referring to FIG. 2, lip 14 has two openings 22 and 24 formed in it. Opening 22 and 24 are position adjacent to each other such that a rib 26 is formed therebetween. Openings 22 and 24 and rib 26 comprise an attachment point 28 formed in link 14.

FIG. 1 shows link 30 attached to lip 14 at attachment point 28 by attachment end 32. Attachment end 32 is a loop formed in link 30 at end 34. Attachment end 32 is formed about rib 26 resulting in a rotatable attachment point 28.

Link 30 has a loop 36 formed in it. Loop 36 is spaced from attachment end 32. Extending from loop 36 is guard portion 38, which is shown extending below leading edge 20 of lip 14.

Two hooks 40 and 42 protrude from the rear of body 12. Hooks 40 and 42 are curved forward and terminate in close proximity to body 12. Body 12 is formed of a soft, pliable plastic material which yields under the force of a bite, or strike, of a fish. When a fish strikes body portion 12 by biting it, hooks 40 or 42 will hook the fish in a manner which is well known in the art. The soft body yields during the strike, thereby exposing more of hooks 40 or 42 to the mouth of the fish. Tassels 44 are shown extending rearwardly from body 12.

Figure 3:
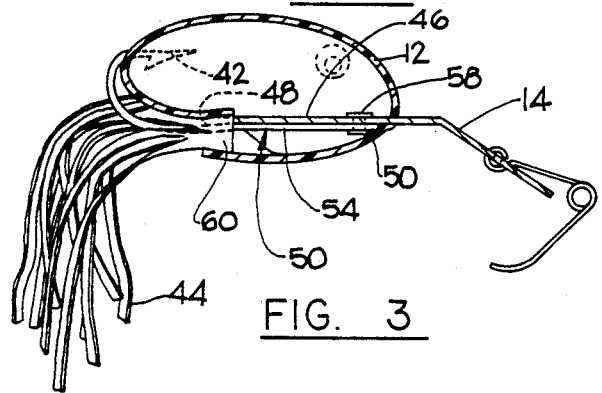
FIG. 3 is a side cross-sectional view taken along line III—III of FIG. 2.
Figure 4:
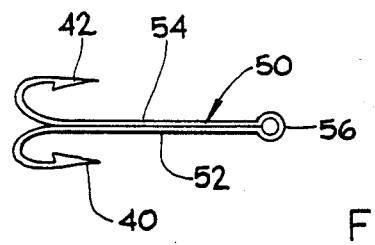
FIG. 4 is a top view of the hook member.

FIG. 3 is a cross section of the fishing lure detailing the attachment of hooks 40 and 42. A single piece frame member is shown comprising lip 14 and reach 46. Lip 14 has a rearwardly projecting reach 46 disposed within the body 12. The reach extends the length of body 12 and terminates at end 48. Reach 46 may terminate within body 12, or may protrude rearwardly out of body 12. Hooks 40 and 42 are formed in the ends of a single member 50, which is shown in FIG. 4. Member 50 has two intermediate portions 52 and 54 which form loop 56 between themselves. Referring to FIG. 3, member 50 is located below reach 46, generally parallel thereto. Member 50 is secured to reach 46 by rivet 58, which passes through loop 56 and reach 46. Tassel 44 has a base 60 which is disposed about reach 46 and intermediate members 52 and 54 near end 48 of reach 46.

When fishing lure 10 is attached to a fishing line (not shown) and pulled through the water, lip 14 causes lure 10 to dive downwardly in the water. As lure 10 travels downwardly, the fishing line pulls upwardly on link 30, resulting in the change of direction of lure 10 to an upward direction. As lure 10 travels upwardly, lip 14 again causes lure 10 to dive down. The process repeats itself, resulting in an oscillatory path in a vertical plane being followed bY fishing lure 10. This path may be sinusoidal or a variation thereof. If weeds, or other marine objects become entangled about lip 14 at attachment point 28, the oscillatory action of lure 10 is impaired. Loop 38 is spaced apart from attachment end 32 such that weeds which may become entangled about loop 38 and the fishing line (not shown) will not interfere with the oscillatory action of the lure. Guard 38 extends downwardly from loop 36 below leading edge 20 of lip 14. The position of guard 38 prevents weeds and other marine objects from becoming entangled about attachment point 28 and attachment end 32. This results in a lure that during use prevents weeds or other marine objects from impairing the action of the lure, even though weeds or other marine objects may become entangled about loop 36 and the fishing line (not shown).

The foregoing description of a preferred embodiment of the invention has been presented for purposes of illustration and description. It is not intended to be exhaustive or to limit the invention to the precise form disclosed. Obvious modifications and variations are possible in light of the above teachings. The embodiment was chosen and described to best illustrate the principal of the invention and its practical application to thereby enable one of ordinary skill in the art to best utilize the invention in various embodiments and with various modifications are are suitable to the particular use contemplated. It is intended that the scope of the invention be defined by the impended hereto.

What is claimed is:

1. A fish lure, comprising:
  (a) a hollow body;
  (b) a single piece frame member comprising
    (i) a lip extending forwardly from said body, said lip configured to impart action to the lure, said lip having a leading edge; and
    (ii) a reach extending rearwardly from said lip, said reach disposed at least partially in said hollow body;
  (c) a rib formed in said lip;
  (d) a link having an attachment end, a guard portion and a loop, said loop being spaced apart from said attachment end, formed between said attachment end and said guard portion, and configured to be connected to a fishing line, said attachment end being attached to said rib, said guard portion having an operative position in which said guard portion is disposed in front of said leading edge extending at least partially below said leading edge without passing through said lip, and extending generally rearwardly whereby weeds and other similar objects are kept from becoming entangled about said rib and said attachment end.

2. The fish lure as claimed in claim 1 wherein said lip comprises first and second planar sections which intersect at an angle to each other.

3. The fish lure as claimed in claim 2 wherein said rib is formed in said second planar section.

4. The fish lure as claimed in claim 1 wherein said link is formed of a continuous one-piece wire having a circular cross-section.

5. The fish lure as claimed in claim 4 further comprising:
  (a) at least one hook connected to said frame member, said hook having a tip, said tip projecting generally forward in close proximity to said body; and
  (b) tassals which extend rearwardly from said body.

* * * * *

UNITED STATES PATENT AND TRADEMARK OFFICE
CERTIFICATE OF CORRECTION

PATENT NO. : 4,893,431
DATED : January 16, 1990
INVENTOR(S) : Harry M. Ehlers

It is certified that error appears in the above-identified patent and that said Letters Patent is hereby corrected as shown below:

Column 4, line 20, change "principal" to -- principle --.

Column 4, line 23, after "modifications", delete "are", and insert therefor -- as --.

Column 4, line 25, delete "impended" and insert therefor -- claims appended --.

Claim 5, column 4, line 58, delete "claim 4" and insert therefor -- claim 1 --.

Signed and Sealed this

Second Day of April, 1991

Attest:

HARRY F. MANBECK, JR.

*Attesting Officer*  *Commissioner of Patents and Trademarks*